United States Patent [19]

Knuchel

[11] Patent Number: 4,494,643
[45] Date of Patent: Jan. 22, 1985

[54] APPARATUS FOR ALIGNING ELONGATED ARTICLES

[75] Inventor: Max Knuchel, Gächlingen, Switzerland

[73] Assignee: SIG- Schweizerische Industrie-Gesellschaft, Neuhausen am Rheinfall, Switzerland

[21] Appl. No.: 320,683

[22] Filed: Nov. 12, 1981

[30] Foreign Application Priority Data

Nov. 28, 1980 [CH] Switzerland .................. 8851/80

[51] Int. Cl.³ ............................................. B65G 47/24
[52] U.S. Cl. ..................................... 198/392; 221/173
[58] Field of Search ............... 198/392, 394, 396, 391, 198/416; 221/167, 171, 173

[56] References Cited

U.S. PATENT DOCUMENTS 3,109,530 11/1963 McPherson .................. 198/394 X
3,640,373 2/1972 Seragnoli .
3,930,571 1/1976 Svensson et al. .

Primary Examiner—Joseph E. Valenza
Assistant Examiner—Dennis Williamson
Attorney, Agent, or Firm—Spencer & Frank

[57] ABSTRACT

An apparatus for aligning elongated articles includes a turntable having a center and a periphery, an input track leading to the turntable for conveying elongated articles thereto and having a discharge end above the turntable and a direction of conveyance; and a guide rail stationarily supported above the turntable. The guide rail has a generally spiral course for guiding the articles towards the periphery of the turntable and aligning the articles in a single file as the turntable rotates. The apparatus further has an outlet track leading away from the turntable and an arrangement for pushing the articles off the turntable onto the outlet track. The guide rail has a first guide rail part situated between the center of the turntable and the discharge end of the input track and extending perpendicularly to the direction of conveyance of the input track. The guide rail includes a second guide rail part extending from an end of the first guide rail part and having a generally spiral course. The second guide rail part has a plurality of spaced indentations arranged for engagement by an end portion of the articles guided along the second guide rail part as the turntable rotates.

6 Claims, 2 Drawing Figures

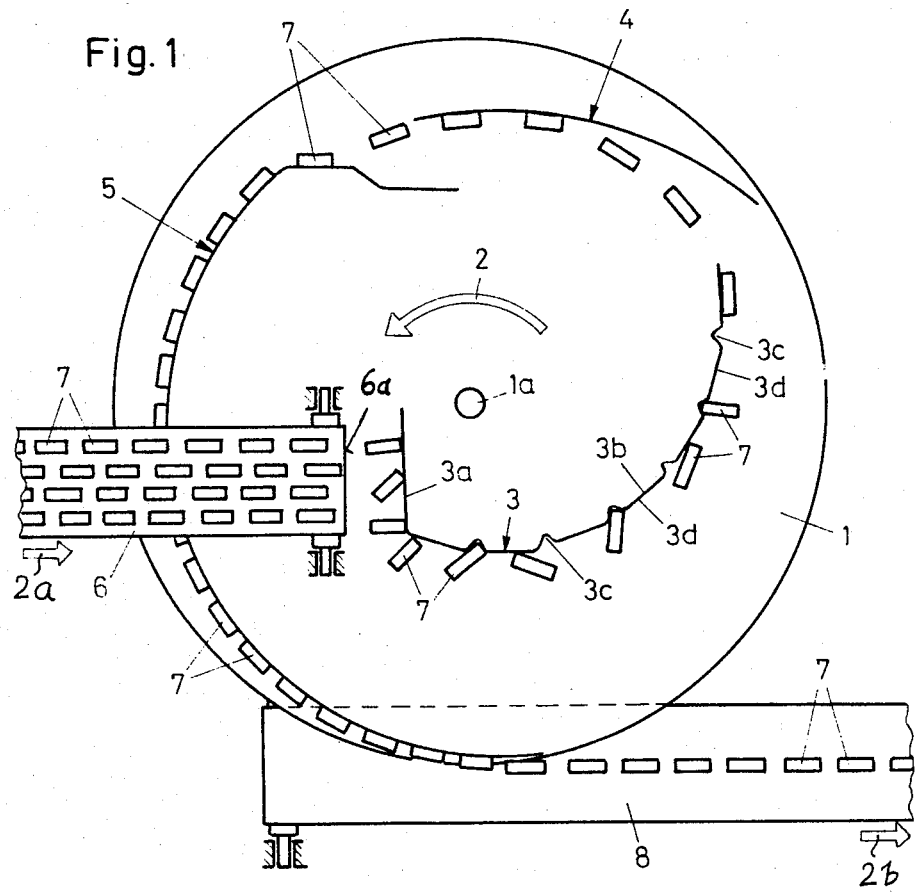
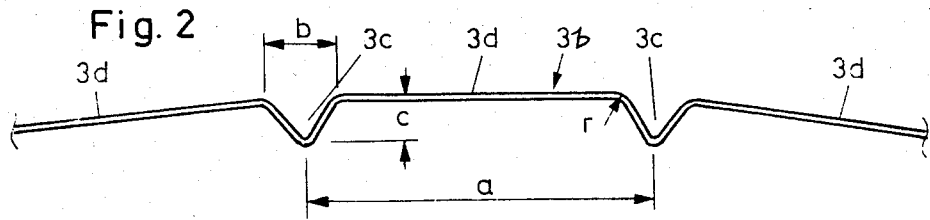

APPARATUS FOR ALIGNING ELONGATED ARTICLES

BACKGROUND OF THE INVENTION

This invention relates to an aligning apparatus for handling longitudinal articles, particularly chocolate bars, and is of the type which has an input track on which articles are advanced to a turntable in consecutive rows which are oriented transversely to the conveying direction and in which the articles are approximately aligned. Above the turntable there is supported a stationary guide rail which when viewed longitudinally, has an essentially spiral course and which, as the turntable rotates, pushes the articles in the direction of the edge of the turntable and aligns them serially to form a single file. The apparatus further has an outlet track onto which the articles are transferred as they are pushed over the edge of the turntable by the guide rail.

Apparatus of the above-outlined type are known. For example, in U.S. Pat. No. 3,640,373 there is disclosed an apparatus wherein above a turntable there are provided a plurality of guide rails which have a continuous curvature and whose guide faces are obliquely oriented to the plane of the turntable. Further, in Swiss Pat. No. 568,908 to which corresponds U.S. Pat. No. 3,930,571 there is disclosed an apparatus which has a single guide rail composed of straight length portions between which obtuse kink points are provided.

The above-outlined machines are particularly adapted for integration in a production line wherein elongated articles are delivered to the input track of the apparatus in an entirely random orientation. More recently, production lines have been developed which deliver elongated articles, such as chocolate bars, to the input track of the aligning apparatus in consecutive rows which are approximately aligned and which are oriented transversely to the conveying direction. It has been found in practice that in such an arrangement the known apparatus outlined above are often not capable of aligning and conveying fast enough the articles fed to the turntable on the input track.

SUMMARY OF THE INVENTION

It is an object of the invention to provide an improved apparatus in which the guide rails are so shaped that the apparatus is capable of aligning elongated articles, supplied to it in approximately aligned rows each comprising several articles, significantly faster and in a more gentle manner than it has been possible before.

This object and others to become apparent as the specification progresses, are accomplished by the invention, according to which, briefly stated, the guide rail has a plurality of spaced, notch-like indentations between which extend straight or slightly curved guide rail sections, and further, the guide rail has at its initial portion a part which extends in front of the discharge end of the input track approximately perpendicularly to the direction of the conveyance of the articles and further, the initial portion of the guide rail is situated between the center of the turntable and the discharge end of the input track.

By means of the notch-like indentations the articles which are situated on the turntable obliquely or transversely to the guide rail are turned, while by means of the guide rail portions which are situated between the indentations, the already approximately aligned articles are brought even more accurately into their desired position. It has been found that by means of the improved aligning effect of the guide rail structured according to the invention, the processing of the articles may be carried out by turntables of smaller diameter than it has been possible heretofore.

BRIEF DESCRIPTION OF THE DRAWINGS

FIG. 1 is a schematic top plan view of a preferred embodiment of the invention.

FIG. 2 is a top plan view, on an enlarged scale, of a part of the structure shown in FIG. 1.

DESCRIPTION OF THE PREFERRED EMBODIMENT

Turning now to FIG. 1, the aligning apparatus shown therein has a turntable 1 which has a center 1a and which is driven by a motor (not shown) at a constant speed in the direction of the arrow 2. Above the turntable 1 there are secured to the machine frame (not shown) three stationary guide rails 3, 4 and 5 whose lower edge is spaced approximately 1-2 mm from the surface of the turntable 1. The guide faces of the three guide rails 3, 4 and 5 are oriented perpendicularly to the upper surface of the turntable 1. An input track formed, for example, of an endless conveyor belt 6 advances the elongated articles (such as chocolate bars) to the turntable 1. The discharge end 6a of the conveyor belt is situated laterally slightly offset over the turntable 1 in the direction of rotation 2 with respect to a turntable diameter drawn parallel to the conveying direction 2a. The articles 7 are advanced in generally aligned rows which contain, for example, four articles each. The rows are oriented perpendicularly to the direction of article advance 2a. The articles are supplied to the conveyor 6 by an in-line machine. The articles fall or slide at the end 6a of the conveyor belt 6 onto the rotating turntable 1 whose rpm is so selected that the centrifugal force imparted on the articles has no effect on their displacement on the turntable 1.

The first guide rail 3 has in its initial zone a straight part 3a which extends between the turntable center 1a and the end 6a of the conveyor belt 6 approximately at right angles to the conveying direction 2a of the conveyor 6. The guide rail part 3a is joined by an essentially spiral-shaped part 3b which is so arranged that its outer guide face as viewed from the beginning to the end of the part 3b continuously approaches the outer edge of the turntable 1.

The guide rail part 3b has on its guide face, that is, on its face oriented away from the center 1a, a plurality of notch-like, V-shaped indentations 3c between which there are arranged straight or slightly curved guide rail portions 3d.

Thus, the guide rail part 3b is composed of alternating guide rail portions 3d and indentations 3c. FIG. 2 illustrates on an enlarged scale a fragment of the guide rail part 3b of the first guide rail 3 with the essential dimensions of the indentations 3c and the guide rail portions 3d. The distance a between two indentation 3c as well as their width b and depth c is determined as a function of the articles 7 to be oriented. For example, for chocolate bars having a length of approximately 6–9 cm and a thickness of 1–2 cm, the following dimensions have been found to be advantageous: $a = 75$ mm, $b = 17$ mm and $c = 8$ mm. The indentations 3c merge into the guide rail portions 3d with rounded portions r.

As the turntable 1 rotates, the articles 7 accumulating on the guide rail part 3a are pushed and rotated therealong. Along the guide face of the guide rail part 3b the articles are rotated until they abut the guide face of the part 3b with one of their long sides. Articles whose position still deviates substantially from the desired position engage with one end into one of the indentations 3c and are thereby turned rapidly into the desired position which is tangential to the guide face of the guide rail part 3b.

The articles leave the end of the first guide rail 3 already in a well pre-aligned position and arrive at the second guide rail 4 whose effective guide face is at the inside of its curvature. Thereafter the articles 7 are handled by a third guide rail 5 whose outer surface gradually pushes them, in a well-aligned orientation, over the edge of the turntable 1 onto an output track 8 which may be an endless conveyor belt. The latter thus advances the articles 7 in an aligned single file to a further processing station in the direction 2b. The arrangement and shape of the second and third guide rails 4 and 5 are known by themselves and do not form part of the invention.

The provision of the indentations 3c in the guide face of the first guide rail 3 has been found to be very effective for a rapid turning of the articles whose position still substantially deviates from the desired tangential orientation with respect to the guide face of the guide rail.

It will be understood that the above description of the present invention is susceptible to various modifications, changes and adaptations and the same are intended to be comprehended within the meaning and range of equivalents of the appended claims.

What is claimed is:

1. In an apparatus for aligning elongated articles, including a turntable having a center and a periphery, an input track leading to the turntable for conveying elongated articles thereto and having a discharge end above the turntable and a direction of conveyance; a guide rail stationarily supported above the turntable; said guide rail comprised of a plurality of consecutive sections angularly offset with respect to one another and having a generally spiral course for guiding the articles towards the periphery of said turntable and aligning the articles in a single file as the turntable rotates, an outlet track leading away from the turntable and means for pushing the articles off the turntable onto said outlet track; the improvement wherein said guide rail has a plurality of spaced, notch-like indentations connecting the consecutive sections with one another and arranged for engagement by an end portion of the articles guided along said guide rail as said turntable rotates; said notch-like indentations constituting depressions in said guide rail as viewed from said periphery.

2. An apparatus as defined in claim 1, wherein length portions of said guide rail between said indentations are substantially straight.

3. An apparatus as defined in claim 1, wherein length portions of said guide rail between said indentations are slightly curved.

4. An apparatus as defined in claim 1, wherein said indentations joint said guide rail with rounded portions.

5. An apparatus as defined in claim 1, further comprising additional guide rails stationarily supported above the turntable for guiding the articles subsequent to being guided by said guide rail; said additional guide rails being void of indentations.

6. An apparatus as defined in claim 5, wherein each guide rail has a guide face arranged perpendicularly to an upper face of said turntable.

* * * * *